United States Patent [19] [11] 4,424,422
Bell et al. [45] Jan. 3, 1984

[54] THERMOSTATICALLY CONTROLLED ELECTRIC DIESEL FUEL HEATER

[75] Inventors: Lon E. Bell; William P. Gruber, both of Altadena, Calif.

[73] Assignee: Technar, Inc., Arcadia, Calif.

[21] Appl. No.: 289,166

[22] Filed: Aug. 3, 1981

Related U.S. Application Data

[63] Continuation-in-part of Ser. No. 174,916, Aug. 4, 1980, abandoned.

[51] Int. Cl.³ .................. H05B 1/02; H01H 37/60; F02M 31/12; F24H 1/10
[52] U.S. Cl. .................. 219/205; 123/142.5 E; 123/549; 123/557; 219/206; 219/301; 219/308; 219/328; 337/345; 337/380; 431/208
[58] Field of Search .................. 219/296–299, 219/301, 302, 328, 205–208; 123/549, 557, 142.5 R, 142.5 E; 337/345, 380; 431/28, 208

[56] References Cited

U.S. PATENT DOCUMENTS

| | | | |
|---|---|---|---|
| 1,633,589 | 6/1927 | Lamont | 219/207 |
| 1,794,215 | 2/1931 | Titus | 219/301 X |
| 1,809,714 | 6/1931 | Mathews | 219/301 X |
| 1,879,428 | 9/1932 | Nilson | 337/380 X |
| 1,905,823 | 4/1933 | Dybvig | 337/345 |
| 2,280,667 | 4/1942 | Scott et al. | 337/345 |
| 2,346,506 | 4/1944 | Pulliam | 219/205 |
| 2,383,414 | 8/1945 | Osterheld | 337/345 X |
| 2,408,873 | 10/1946 | Osterheld | 337/345 |
| 2,757,270 | 7/1956 | Fairbanks | |
| 2,793,280 | 5/1957 | Harvey | 219/301 X |
| 2,824,209 | 2/1958 | Leipold | |
| 2,915,615 | 12/1959 | Leipold et al. | |
| 3,019,325 | 1/1962 | Clouse | 219/205 |
| 3,120,600 | 2/1964 | True | 219/301 |
| 3,139,518 | 6/1964 | Gardener | 219/301 X |
| 3,622,747 | 11/1971 | Cibie | 219/301 X |
| 3,658,041 | 4/1972 | Lowrey | 219/206 X |
| 4,025,755 | 5/1977 | Shirley et al. | 219/549 |
| 4,214,147 | 7/1980 | Kraver | 219/301 |
| 4,218,999 | 8/1980 | Sheared | 123/557 |

FOREIGN PATENT DOCUMENTS

| | | | |
|---|---|---|---|
| 56139 | 1/1938 | Denmark | 337/345 |
| 917446 | 2/1963 | United Kingdom | 219/301 |

*Primary Examiner*—A. Bartis
*Attorney, Agent, or Firm*—Christie, Parker & Hale

[57] ABSTRACT

A thermostatically controlled electric fuel heater for raising the temperature of diesel fuel flowing from a fuel tank to a fuel filter to prevent precipitation of wax crystals in the fuel filter and consequent filter clogging at low ambient temperatures includes a heat conductive tube incorporated as part of the fuel line a short distance upstream of the filter. An electric heating assembly is positioned on the tube and includes an electric resistance heating element helically wound about the tube and controlled by a thermostat responsive to the temperature of the tube and located upstream from the heating element. The thermostat includes a molded plastic frame having a central opening through which the tube passes. The thermostat includes a bimetallic thermal element secured to the frame and arranged to actuate a snap-action switch carried by the frame. The frame includes a baffle for thermally isolating the thermal element from the heating element. A housing concentric with the tube encloses the electric heating element and thermostat.

6 Claims, 5 Drawing Figures

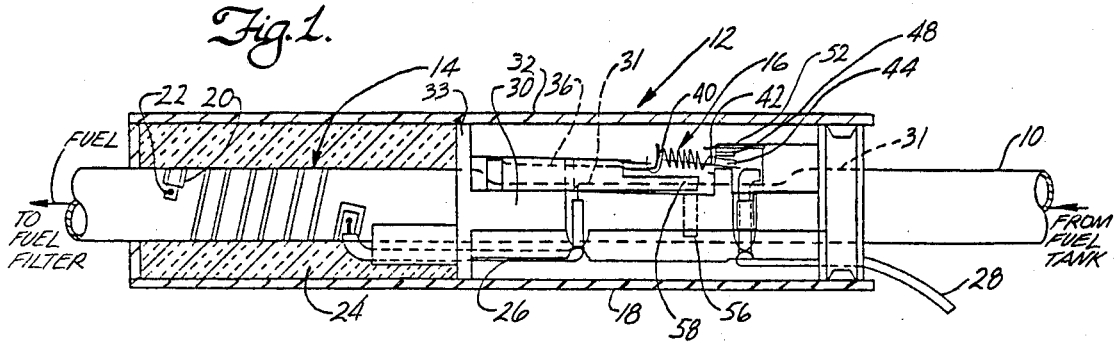

4,424,422

THERMOSTATICALLY CONTROLLED ELECTRIC DIESEL FUEL HEATER

RELATED CASE

This application is a continuation-in-part of application Ser. No. 174,916, filed Aug. 4, 1980, now abandoned.

FIELD OF THE INVENTION

This invention relates to an electrical fuel line heater, and more particularly, to a thermostatically controlled fuel heater for a diesel engine.

BACKGROUND OF THE INVENTION

The fuel for diesel engines contains a wax-like constituent that precipitates out of the fuel as small wax crystals at lower temperatures. In the operation of diesel engines for automobiles, trucks and the like, the crystals become large enough to clog the fuel filter and reduce the delivery of fuel to the engine. This problem becomes progressively worse as ambient temperatures drop below the range of 0 to 10 degrees Fahrenheit. This clogging and loss of fuel delivery makes operation of the engine, particularly during starting, difficult and erratic in the colder regions of the country.

SUMMARY OF THE INVENTION

The present invention is directed to a diesel fuel heater that is electrically powered and operates to increase the fuel temperature from 5 to 20 degrees Fahrenheit above ambient, depending on the heater power output and the fuel flow rate. The heater unit is connected in the fuel inlet line a short distance upstream from the fuel filter. The fuel heater system of the present invention has the advantage that the heater is incorporated as part of the fuel line and, in fact, is a component of the fuel feed system. Thus no additional seals or joints are required that increase the cost and provide an additional source of fuel leakage. The system is thermostatically controlled so that it is protected against overheating by a dry fuel line or lack of fuel flow. The heater adapts automatically to different operating temperatures and power output levels, and the assembly design is rugged, compact and reliable, making it suitable for under-the-hood environment.

In brief, these and other advantages of the present invention are achieved by providing a heater comprising a section of metal tubing forming a part of the fuel line on which is wrapped a resistance heating element in thermal contact with the tube. A thermostatic element is mounted on the tube upstream of the heating element and includes a bimetal thermal unit and a snap-action switch. The bimetal element is partially in contact with the tube and responds directly to changes in temperature of the tube and the fuel being transmitted by the tube. When heated to a predetermined temperature, the bimetal unit actuates the switch to open the circuit to the heater to turn off the heater.

BRIEF DESCRIPTION OF THE DRAWINGS

For a better understanding of the invention reference should be made to the accompanying drawings, wherein:

FIG. 1 is a side elevational view of the preferred embodiment of the invention;

FIG. 2 is a top view of the embodiment of FIG. 1;

FIG. 3 is a sectional view taken substantially on the line 3—3 of FIG. 2;

FIG. 4 is a simplified side view of the thermostat switch useful in explaining the operation of the invention; and FIG. 5 is a simplified view of an alternative design of the thermostat switch.

DETAILED DESCRIPTION

Referring to the preferred embodiment of FIGS. 1-4, the numeral 10 indicates a length of metal tubing which is incorporated as part of the fuel line from the fuel tank to the fuel pump of a diesel engine. A heater assembly, indicated generally at 12, is mounted on and is coaxial with the tube 10. The heater assembly is preferably positioned immediately adjacent to but upstream of the fuel filter (not shown) normally employed with a diesel engine to remove particulate matter from the fuel before it is injected into the engine cylinders.

The heater assembly includes an electrical resistance type heater element, indicated generally at 14, a thermostatic switch assembly, indicated generally at 16, and a tubular protective housing 18. The heating element 14 is preferably made in the form of a ribbon of stainless steel 22 forming the resistance heater wound in a helix on a substrate 20 which electrically insulates the heating element from the tube. The substrate is made of a thin thermally conductive electrically insulating material. The heating element is made of a stainless steel and is bonded to the substrate to increase heat transfer through the substrate to the tube. The heating element 14 is surrounded by an insulating fiber 24 to insure efficient heat transfer to the tube and the fuel flowing through the tube with minimum loss to the environment. One end of the heater ribbon 22 is spot welded or otherwise directly attached to the tube to provide an electrical ground. The other end of the heater ribbon 22 is connected to a lead 26 which electrically connects the heater to an external power lead 28 through the thermostatic switch assembly 16 in the manner hereinafter described.

The switch assembly 16 includes a substantially spool-shaped molded plastic frame 30 having a central longitudinal opening through which the tube 10 passes. The plastic frame 30 is spaced from the heater in a direction upstream of the heater, so that the fuel is heated after it passes the thermostatic switch. The plastic frame has molded flange 33 at the inner end which forms a baffle. The baffle acts to further isolate the thermostatic switch from convection or radiant heating by the heater. The top of the frame is open to expose a portion of the tube. The tube 10 is preferably flattened slightly on one side, as indicated at 31, opposite the opening of the top of the frame to provide clearance for the switch assembly. The open top of the frame is bridged by a metal support member 32.

The metal support member 32 is channel shaped at one end with flanges 34 on either side which are riveted or otherwise secured to the open top of the frame 30. A bimetal thermal element 36 is spot welded at one end or otherwise secured to the underside of the frame member 32 so as to be adjacent to the exposed portion of the tube 10. The bimetal element 36 may be curved or offset slightly adjacent the end attached to support member 32 to bring it closer to the tube 10. The free end of the bimetal element extends beyond the end of the frame member 32 and is bifurcated to form two upturned fingers 38. These fingers are notched at 40 to provide a pivot point or fulcrum for a U-shaped contact arm 42 which supports a moving contact 44 of an electrical switch. A tension spring 46 is connected at one end to the outer end of the frame member 32 and at the other end to the outer end of the switch arm 42.

The spring 46 provides an over-center action as the bimetal element 36 moves the pivot notch 40 toward or away from the tube as it becomes colder or hotter in temperature. As shown in FIG. 3, the bimetal element 36 is in its normal position under high ambient temperature conditions. As the ambient temperature drops, the bimetal element 36 moves closer to the tube causing the pivot notches 40 to move below the center line of the spring 46 and causing the arm to rotate the moving contact 44 upwardly against a fixed electrical contact 48, thus closing the switch. The fixed contact 48 is preferably mounted on a leaf spring 50 secured to a metal contact member 52 which bridges the tube and is secured on either side to the open top portion of the frame 30. Movement of the fixed contact 48 and supporting leaf spring 50 is limited by a stop 54 which is integral with the contact member 52. The leaf spring 50 is provided to insure that uniform contact pressure between the fixed contact 48 and moving contact 44 is maintained as the bimetal moves before the contact 44 is moved from the closed position to the open position.

The switch 16 can be calibrated by a set screw 56 which threadedly engages the plastic frame member 30 and engages an arm 58 connected to the bridging frame member 32. Adjustment of the screw 56 tilts the arm 58 bending the outer top portion of the frame member 32, thereby shifting the end of the over-center spring 46 away from the tube. This has the effect of changing the position of the bimetal element at which the spring 46 snaps over center to open or close the switch.

After the thermostatic switch is in position on the tube 10, a potting compound having good thermal conductive properties compared to air but providing good electrical insulation may be injected in the space between the tube and the fixed end of the bimetal element 36, as indicated at 60. This improves the thermal response of the switch to changes in temperature of the tube. The power lead 28 is directly connected to the switch contact member 52 so that when the switch contacts are closed, an electrical circuit is completed between the lead 28 and the lead 26 going to the heater, the switch providing a current path from the fixed contact 48 to the moving contact 44 through the switch arm 42 and bimetal element 36. A piece of electrical tape or other insulating material may be secured to the under side of the bimetal element, as indicated at 62, to prevent any electrical contact between the tube and bimetal element when the switch contacts are closed, thus preventing any short to ground.

The thermostatic switch is shown in simplified diagramatic form in FIG. 4 to better illustrate its construction and mode of operation. It will be readily apparent from FIG. 4 that as the bimetal element 36 moves down, the pivot notch 40 moves the ends of the U-shaped contact arm 42 down below the center line of the spring 46. This causes the spring 46 to pull the moving contact 44 upwardly against the fixed contact 48, compressing the leaf spring 50 and moving the contact 48 against the member 52. As the bimetal element 36 heats up, the notch 40 is moved upwardly above the center line of the spring 46, causing the spring 46 to pull the moving contact 44 downwardly against a spot 64.

While FIG. 4 shows the preferred embodiment, it will be appreciated that the arm of the frame member 32 to which the spring is attached may be a bimetal material in which case the end of the spring is moved up and down with temperature to cause an over-center action in moving the contact 44 between the stop 64 and the fixed contact 48. It will be further appreciated that both the elements 32 and 36 may be constructed of bimetal. If they bend in opposite directions relative to each other with a given temperature change, this wil increase the sensitivity of the switch. If they bend the same direction, this reduces the sensitivity of the switch and may be used to compensate for variations in ambient conditions if this is desirable.

The thermostatic switch can be further modified as shown in FIG. 5 to provide a resistance heating element 66 attached to the bimetal element 36 to apply heat to the bimetal. The heater 66 may be used either to operate the switch as a relay from an external electrical control of the heater 66 or may be used as an anticipator to reduce the magnitude of the hysteresis or "dead" zone and increase the sensitivity of the switch to changes in the temperature of the tube 10. By applying a current to the heater 66, the switch can be caused to open or close. In the case of the relay of FIG. 5, it may be desirable to reverse the bimetal beyond the heater to provide ambient temperature compensation or make the arm of the frame member 32 of bimetal, as described above.

From the above description it will be seen that the present invention provides a fuel heater having a bimetal actuator that provides a unique thermal snap-action switch. The switch mechanism has high contact force and maintains high contact force until the instant of snap and has good contact wipe action. The snap-action produces positive closure and an operating dead band that greatly reduces the number of actuations, thereby providing a heater control having long operating life. The fuel heater has several built-in protection features. The thermal element responds directly to fuel temperature because the thin heat conductive wall of the tube provides close thermal coupling. Also, the fuel passes the thermal switch before it is heated by the heater. Therefore, the thermal switch will remain closed as long as the ambient temperature of the fuel is below the critical level. However, if fuel is absent or not flowing through the heater, such as during start-up or because the vehicle has run out of fuel, the thermostatic switch will sense the rise in temperature of the tube from the heat generated by the heater and shut off power. Once fuel flows or the heater has cooled sufficiently, the heater will turn on again. Also, by having the switch upstream of the heater, the flow rate of the fuel through the filter is better controlled. At high flow rates, the heater produces a small temperature rise. This is no problem since a high flow rate through the filter is the goal. However, if the temperature rise is not sufficient, the wax in the fuel tends to clog the filter and reduce the flow rate. This results in a greater temperature rise in the fuel passing the heater. The hotter fuel, in turn, acts to reduce the clogging of the filter to increase the flow rate. Only if the flow rate does not increase so the temperature of the fuel continues to rise does the thermostatic switch act to disconnect the heater from the power source.

What is claimed is:

1. A fuel heater for raising the temperature of diesel fuel passing through a fuel filter comprising:

a heat conductive tube for transmitting the fuel to a filter, a resistance heating element in thermal contact with the tube for transmitting heat to the tube and fuel therein, a thermostat including a thermal element, a snap-acting switch mounted on and secured to the tube adjacent the heating element, the thermal element being spaced from the heating element in a direction upstream of the heating element, the switch when closed completing an electrical circuit through the heating element, the thermal element when heated above a predetermined temperature opening the switch and breaking said circuit, the thermostat including a molded plastic frame having a central opening therethrough for receiving the tube, the thermal element including an elongated bimetal member secured at one end to the frame, the bimetal member extending lengthwise of the tube and immediately adjacent thereto, the bimetal member bending away from the tube with increase in temperature to open the switch.

2. Apparatus of claim 1 wherein said molded plastic frame includes a baffle surrounding the tube, the baffle being positioned at the end of the frame immediately adjacent the heating element for thermally isolating the heating element from the thermal element.

3. Apparatus of claim 1 wherein said switch includes a fixed contact, a pivoted switch arm, a movable contact carried by the switch arm, an over-center spring attached to said arm and the frame for urging the arm and movable contact in one direction toward the fixed contact or the other direction away from the fixed contact, and means connected to the bimetal member for moving one end of the spring relative to the pivot point of the pivoted arm to change the direction the spring urges the arm about its pivot point.

4. A fuel heater comprising:
a heat conductive tube for transporting the fuel, an electrical resistance type heating element in heat conducting contact with the tube for heating the tube and the fuel passing through the tube, a thermostatic switch element secured to the tube adjacent to but spaced from the heater for controlling current flow through the heating element, a housing concentric with the tube enclosing a portion of the tube, the heating element and thermostatic switch element, the thermostatic switch element including a frame of electrically non-conductive material having an opening therethrough through which the tube passes, and a temperature sensitive switch mounted on the frame adjacent the tube for switching on current through the heating element when the temperature of the tube drops below a predetermined level and switching off the current when the temperature of the tube is above a predetermined level, the heating element being positioned downstream of the thermostatic element.

5. Apparatus of claim 4 wherein the switch includes a fixed contact, a moving contact arm, a pivot member pivotally supporting the contact arm from the frame, the contact arm rotating relative to the pivot member toward or away from the fixed contact to close or open the switch, and an over-center tension spring connecting the arm to the frame member for moving the contact arm, the pivot member supporting the contact arm at a point intermediate the ends of the spring, and temperature responsive means moving the pivot member relative to the centerline of the spring to reverse the direction in which the spring rotates the arm relative to the pivot member.

6. Apparatus of claim 5 wherein the pivot member includes a temperature sensitive bimetal element for moving the pivot member relative to the frame member with changes in temperature.

* * * * *